(12) United States Patent
Beesley et al.

(10) Patent No.: US 11,639,102 B2
(45) Date of Patent: May 2, 2023

(54) INTEGRATED POWER SOURCE AND HOUSING

(71) Applicant: Dana Automotive Systems Group, LLC, Maumee, OH (US)

(72) Inventors: Peter A. Beesley, Fort Wayne, IN (US); Gerald L. Kinsey, Claypool, IN (US); Andy Perakes, Canton, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 252 days.

(21) Appl. No.: 17/041,992

(22) PCT Filed: Mar. 29, 2019

(86) PCT No.: PCT/US2019/024887
§ 371 (c)(1),
(2) Date: Sep. 25, 2020

(87) PCT Pub. No.: WO2019/191618
PCT Pub. Date: Oct. 3, 2019

(65) Prior Publication Data
US 2021/0138899 A1     May 13, 2021

Related U.S. Application Data

(60) Provisional application No. 62/649,900, filed on Mar. 29, 2018.

(51) Int. Cl.
*F16H 57/02* (2012.01)
*B60K 23/08* (2006.01)
*B60K 17/34* (2006.01)

(52) U.S. Cl.
CPC ......... *B60K 23/0808* (2013.01); *F16H 57/02* (2013.01); *B60K 17/34* (2013.01);
(Continued)

(58) Field of Classification Search
CPC ............... B60K 23/0808; B60K 17/34; B60K 2023/0833; B60K 2023/0858;
(Continued)

(56) References Cited

U.S. PATENT DOCUMENTS 6,849,017 B2   2/2005   Nett
8,047,323 B2   11/2011  Downs et al.
(Continued)

FOREIGN PATENT DOCUMENTS

CN     206528311 U  *  9/2017
EP     2644429 A1     10/2013
(Continued)

OTHER PUBLICATIONS

ISA European Patent Office, International Search Report and Written Opinion Issued in Application No. PCT/US2019/024887, dated Aug. 12, 2019, WIPO, 14 pages.

*Primary Examiner* — Justin Holmes
(74) *Attorney, Agent, or Firm* — McCoy Russell LLP (57) ABSTRACT

An axle including a housing having a first cavity and a second cavity formed therein. The first cavity is configured to receive at least a portion of an axle assembly therein, and the second cavity is configured to receive at least a portion of a power source assembly therein.

19 Claims, 6 Drawing Sheets

(52) U.S. Cl.
CPC ............. *B60K 2023/0833* (2013.01); *B60K 2023/0858* (2013.01); *B60Y 2300/20* (2013.01); *B60Y 2306/09* (2013.01); *F16H 2057/02052* (2013.01)

(58) Field of Classification Search
CPC ............. B60K 17/344; F16H 57/02; F16H 2057/02052; B60Y 2300/20; B60Y 2306/09
See application file for complete search history.

(56) References Cited

U.S. PATENT DOCUMENTS

| | | | |
|---|---|---|---|
| 9,079,495 B2 | 7/2015 | Valente et al. | |
| 9,102,234 B2 | 8/2015 | Cook et al. | |
| 9,103,432 B2 * | 8/2015 | Isomura | F16H 57/0427 |
| 9,341,238 B2 | 5/2016 | Peura et al. | |
| 9,428,051 B1 | 8/2016 | Zink et al. | |
| 9,783,035 B1 * | 10/2017 | Huang | F16H 63/304 |
| 2011/0192245 A1 | 8/2011 | Shioiri et al. | |
| 2015/0136559 A1 | 5/2015 | Brumberger et al. | |
| 2017/0023114 A1 * | 1/2017 | Wang | B60K 1/00 |
| 2017/0167544 A1 | 6/2017 | Beesley et al. | |

FOREIGN PATENT DOCUMENTS

| | | | | |
|---|---|---|---|---|
| EP | 2769865 A1 | 8/2014 | | |
| WO | 2013186076 A1 | 12/2013 | | |
| WO | WO-2017106620 A1 * | 6/2017 | | B60B 35/122 |

\* cited by examiner

INTEGRATED POWER SOURCE AND HOUSING

CROSS-REFERENCE TO RELATED APPLICATIONS

The present application is a U.S. National Phase of International Application No. PCT/US2019/024887, entitled "INTEGRATED POWER SOURCE AND HOUSING", and filed on Mar. 29, 2019. International Application No. PCT/US2019/024887 claims priority to U.S. Provisional Application No. 62/649,900, entitled "INTEGRATED MOTOR AND HOUSING", and filed on Mar. 29, 2018. The entire contents of each of the above-listed applications are hereby incorporated by reference for all purposes.

TECHNICAL FIELD

The presently disclosed subject matter relates to a vehicle driveline, and more particularly to an axle for the vehicle driveline.

BACKGROUND

In an all-wheel drive ("AWD") vehicle, a primary axle assembly may be continually connected to the vehicle's power source while a secondary axle assembly is selectively connected to the vehicle's power source via a driveline disconnect apparatus.

Traditionally, the AWD vehicle was disadvantaged by lower fuel efficiency, as compared to two-wheel-drive vehicles. Even when the secondary axle assembly was not drivingly engaged with the power source, traditional drivelines required continuous rotation of a secondary axle assembly at road speed. Consequently, traditional AWD vehicles would lose energy and experience decreased fuel efficiency as compared to vehicles having only a single drive axle.

Driveline disconnect apparatuses may be utilized to disconnect driveline components of the secondary axle assembly, thereby improving the fuel efficiency of the AWD vehicle. However, conventional vehicle drivelines having rear drive unit clutches or a disconnect apparatus suffer from noise, vibration, and harshness ("NVH"). The disclosure herein describes an apparatus and system providing more even torque transmission and reduced NVH.

It would be desirable to produce an axle which enhances efficiency and manufacturability, while a cost and weight thereof is minimized.

SUMMARY

In concordance and agreement with the present disclosure, an axle which enhances efficiency and manufacturability, while a cost and weight thereof is minimized, has surprisingly been discovered.

In an embodiment, an axle, comprises: a housing having a cavity formed therein, wherein the cavity is defined by a first wall and a second wall, the first wall including at least a first portion and a second portion, wherein a first shoulder is formed between the first portion and the second portion of the first wall; an aperture formed through the second wall; and a power source assembly at least partially disposed in the cavity of the housing, the power source assembly including an output shaft extending through the aperture formed in the second wall of the housing.

In another embodiment, an axle, comprises: a housing having a first cavity and a second cavity formed therein, wherein the first cavity is configured to receive at least a portion of an axle assembly therein, and the second cavity is configured to receive at least a portion of a power source assembly therein.

As aspects of certain embodiments, the second cavity has a generally cylindrical shape.

As aspects of certain embodiments, the first wall further includes a third portion, wherein a second shoulder is formed between the second portion and the third portion of the first wall.

As aspects of certain embodiments, at least one of the first and second shoulders has one of a generally stepped shape and a generally conical shape.

As aspects of certain embodiments, a diameter of the second portion of the first wall is less than a diameter of the first portion of the first wall and greater than a diameter of the third portion of the first wall.

As aspects of certain embodiments, the power source assembly further includes at least one bearing to rotatably support the output shaft within the housing, wherein the at least one bearing is at least partially disposed in the second wall of the housing.

As aspects of certain embodiments, the second wall further includes a socket formed therein, the socket configured to receive the at least one bearing therein.

As aspects of certain embodiments, the axle further comprising a cover coupled to the housing and configured to perform as a closure to the second cavity.

As aspects of certain embodiments, the axle further comprising a sealing member disposed between the housing and the cover to form a substantially fluid-tight seal therebetween.

As aspects of certain embodiments, an axis of rotation of the axle assembly is parallel to an axis of rotation of the power source assembly.

As aspects of certain embodiments, the housing further includes a web integrally formed between the first cavity and the second cavity.

As aspects of certain embodiments, the power source assembly includes the output shaft extending from the second cavity through the aperture formed in the second wall of the housing and into the first cavity.

BRIEF DESCRIPTION OF THE FIGURES

The accompanying drawings are incorporated herein as part of the specification. The drawings described herein illustrate embodiments of the presently disclosed subject matter, and are illustrative of selected principles and teaching of the present disclosure and do not illustrate all possible implementations thereof. The drawings are not intended to limit the scope of the present disclosure in any way.

DETAILED DESCRIPTION

It is to be understood that the presently disclosed subject matter may assume various alternative orientations and step sequences, except where expressly specified to the contrary. It is also to be understood that the specific devices, assemblies, systems and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
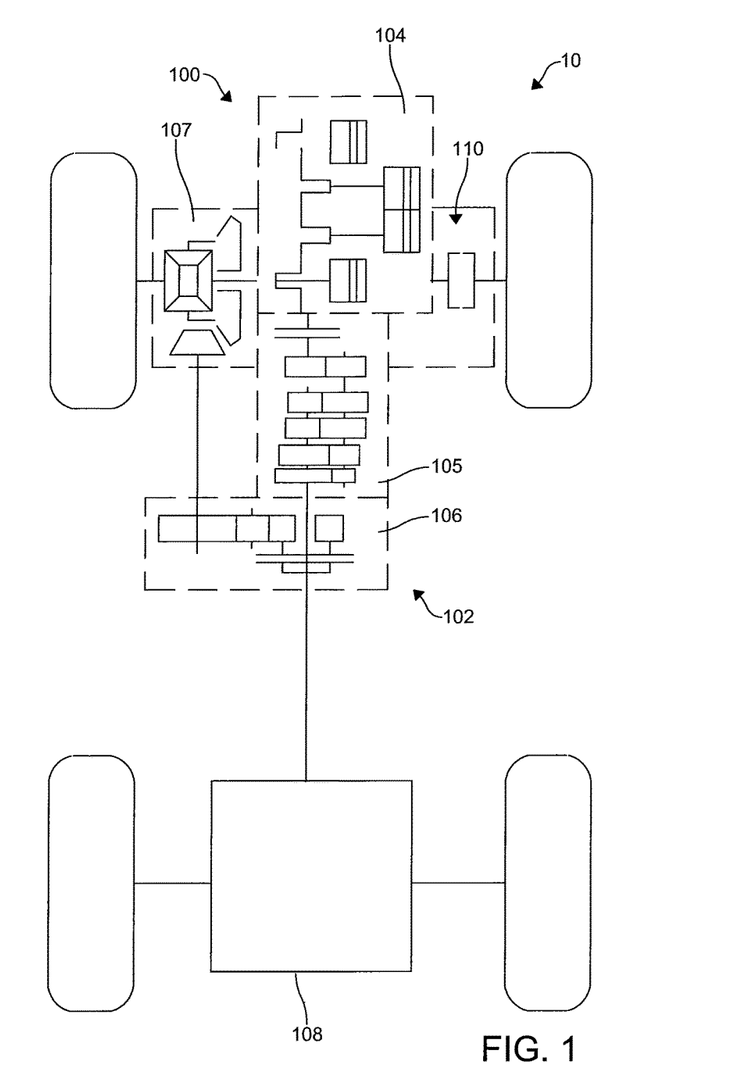
FIG. 1 is a schematic diagram of an AWD vehicle driveline according to an embodiment of the presently disclosed subject matter.

Referring now to FIG. 1, in an embodiment, an axle 100 may be utilized in an AWD vehicle 10. The AWD vehicle 10 may have a driveline arrangement 102 including a longitudinal power source 104. The power source 104 may be, but is not limited to, an internal combustion engine or an electric motor. The driveline arrangement 102 may also include a transmission 105 having an input driveably connected to the power source 104 and an output driveably connected to a transfer case 106. The transfer case 106 including an output continuously driveably connected to a rear drive unit 108 and a second output selectively driveably connected to a front drive unit 107. The front drive unit 107 may comprise a differential mechanism which is driveably connected to a wheel of the axle 100, and driveably connected with a front axle disconnect 110. When utilized in conjunction with a clutch in the transfer case 106, the front axle disconnect 110 provides improved fuel economy by disconnecting AWD driveline components when AWD functionality is not engaged.

Figure 2A:
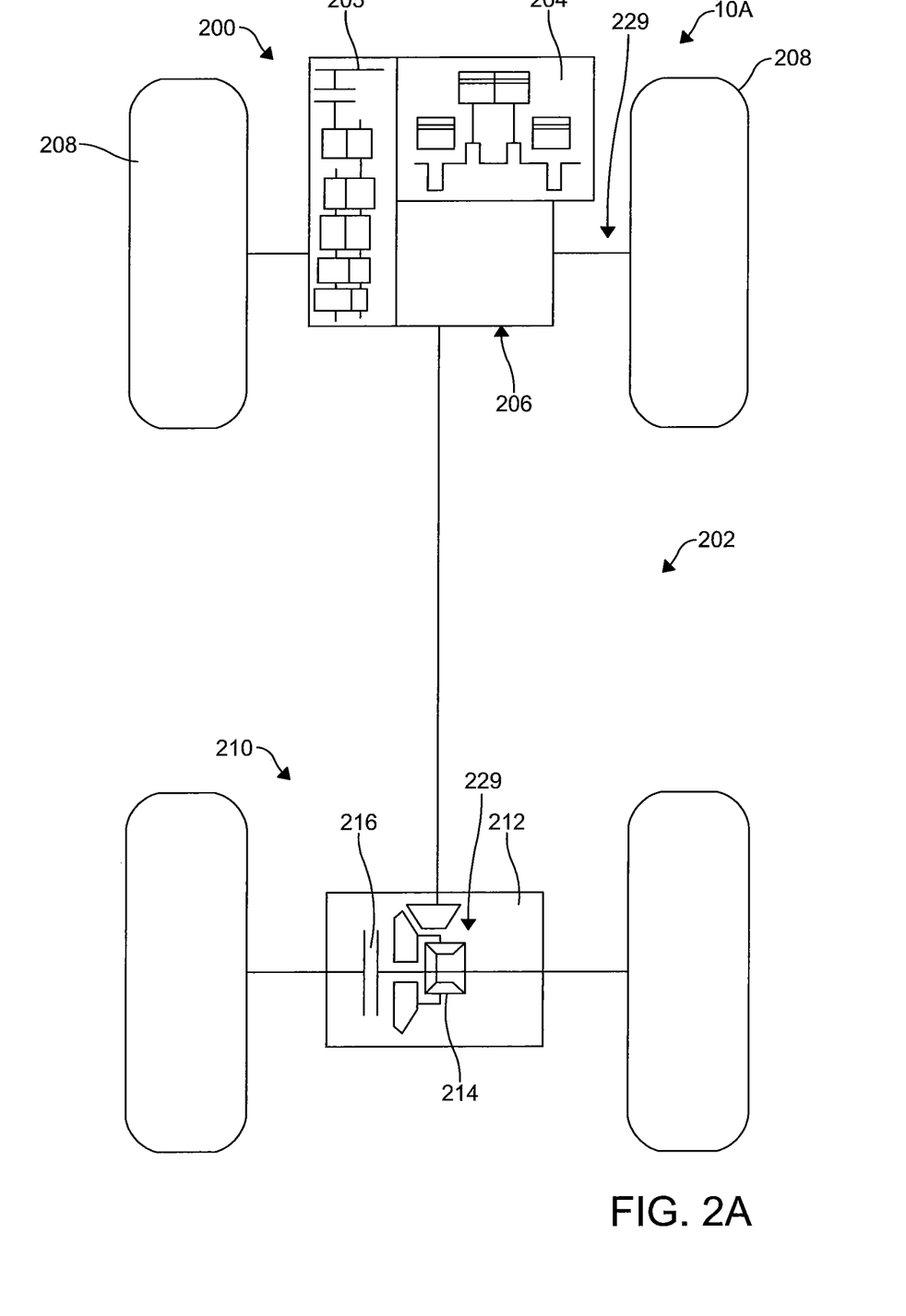
FIG. 2A is a schematic diagram of an AWD vehicle driveline according to another embodiment of the presently disclosed subject matter.
Figure 2B:
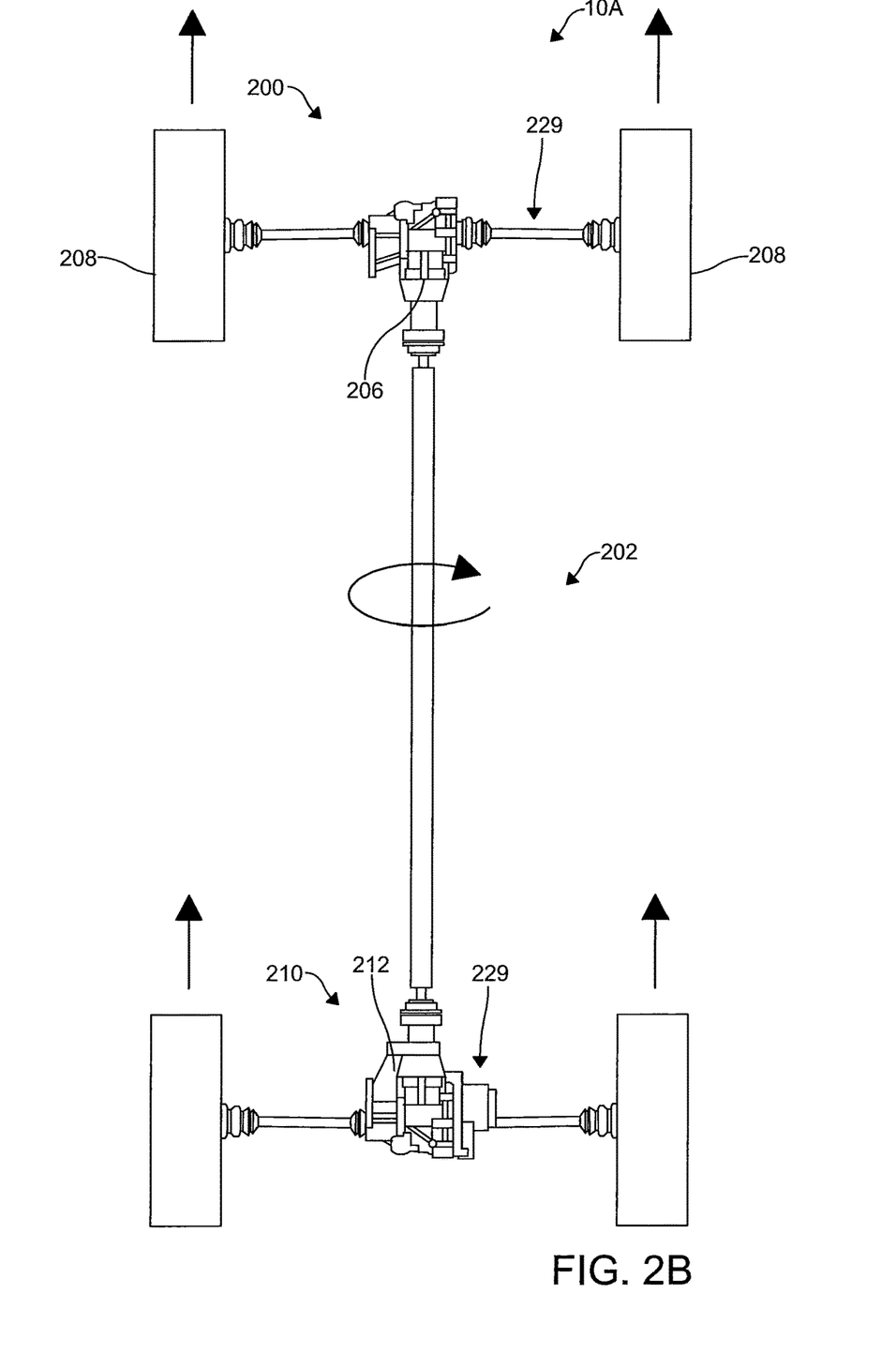
FIG. 2B is a graphical representation of the AWD vehicle driveline according to FIG. 2A.

In another embodiment, as illustrated in FIGS. 2A and 2B, the axle 200 may be utilized in an AWD vehicle 10A. The AWD vehicle 10A may include a driveline arrangement 202 comprising a transverse power source 204. The power source 204 may be, but is not limited to, an internal combustion engine or an electric motor. In addition, the driveline arrangement 202 may include a transmission 205 having an input driveably connected to the power source 204 and an output driveably connected to a power transfer unit 206. The power transfer unit 206 may be in driving engagement with a differential mechanism (not depicted) driveably connected to a wheel-set 208 of the axle 200. The power transfer unit 206 may also be selectively driveably connected to another axle 210. The axle 210 may include a rear drive unit 212 comprising a differential mechanism 214 and a clutch 216. The power transfer unit 206 may comprise a connect/disconnect apparatus (not depicted). Operating the connect/disconnect apparatus in conjunction with the rear drive unit clutch 216 provides improved fuel economy by disconnecting AWD driveline components when AWD functionality is not engaged.

Certain embodiments of axles 100, 200, 210 are utilized with an all-wheel-drive ("AWD") driveline assembly. However, the axles 100, 200, 210 are not limited to use with the driveline assemblies described herein. The axles 100, 200, 210 may be utilized with, but is not limited to, driveline assemblies of other shapes, sizes, orientations, and designs. It should also be appreciated that the axles 100, 200, 210 may be any suitable type of axle as desired such as a conventional drive axle or an electric drive axle, for example. Furthermore, it would be understood by one of ordinary skill in the art that these embodiments could have industrial, locomotive, military, and aerospace applications, as well as applications in consumer, electric, and autonomous or semi-autonomous vehicles.

Figure 3:
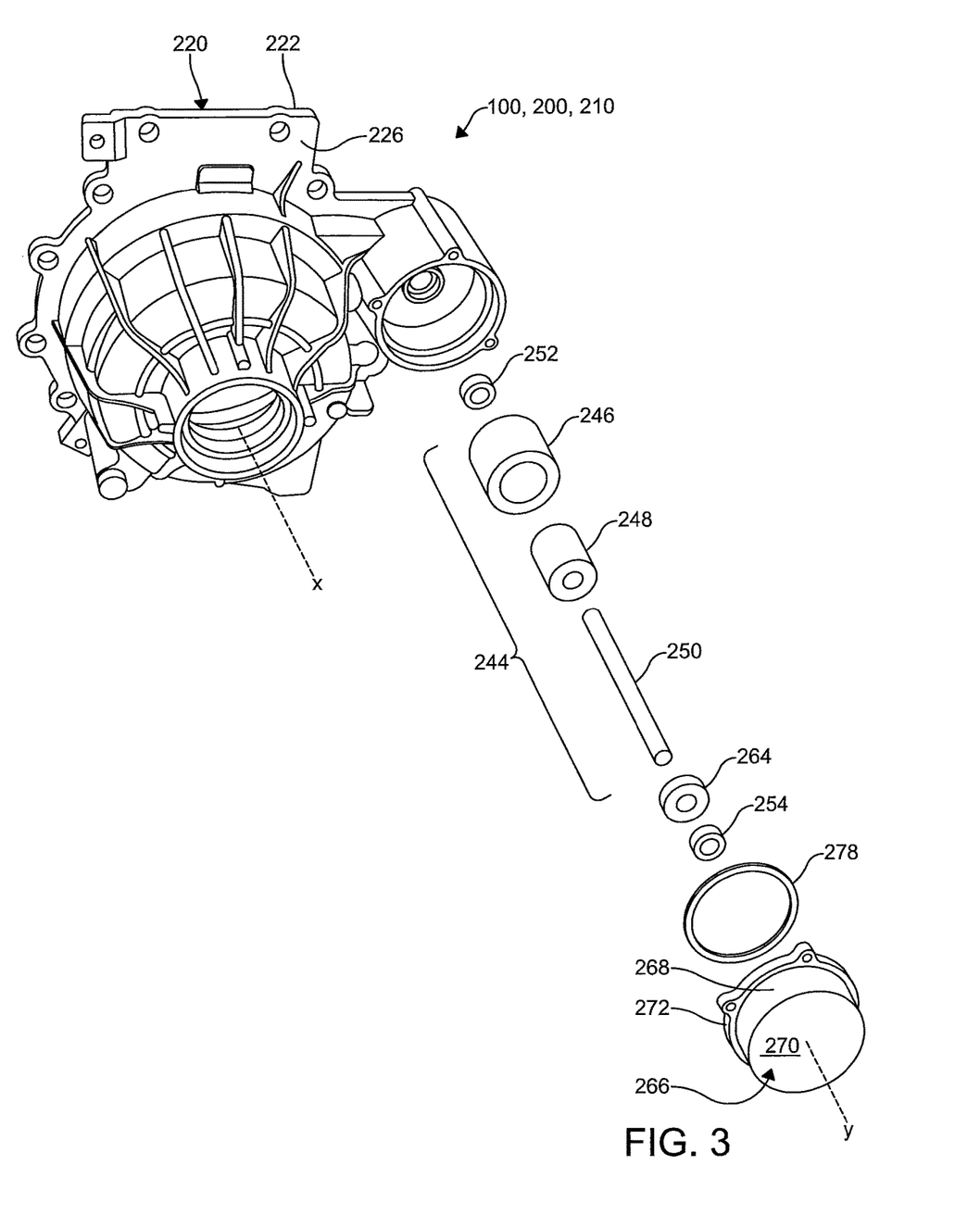
FIG. 3 is a perspective view of a portion of an axle including an integrated power source housing according to an embodiment of the presently disclosed subject matter, wherein a power source assembly disposed in the power source housing is shown exploded therefrom and illustrated generally as a graphical representation.
Figure 4:
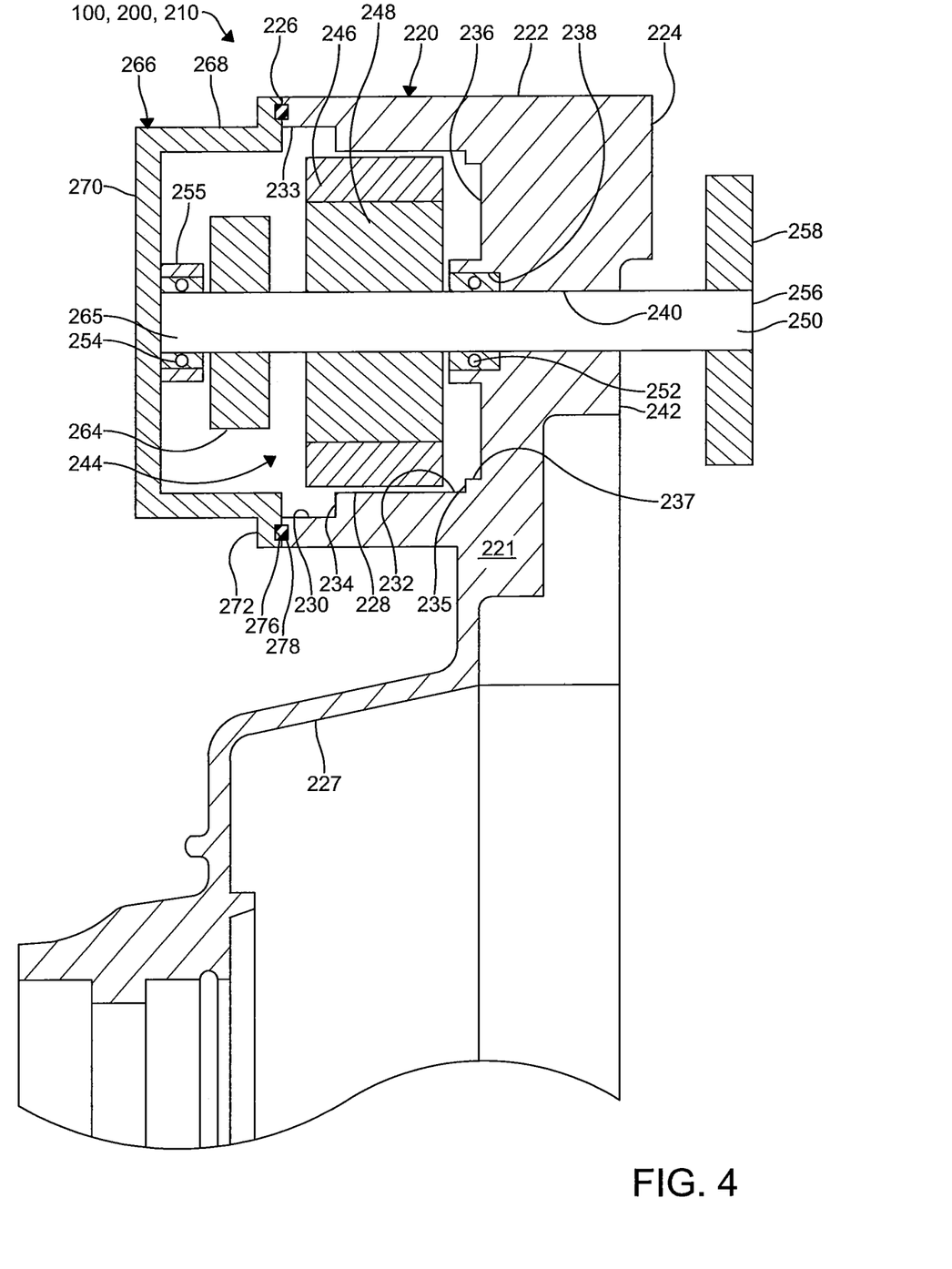
FIG. 4 is a fragmentary cross-sectional view of the portion of the axle including the integrated power source housing shown in FIG. 3, wherein the power source assembly disposed in the power source housing is illustrated generally as a graphical representation.

Each of the axles 100, 200, 210 may include a housing 220 shown in FIGS. 3-4. The housing 220 may comprise a first housing portion 222 and a second housing portion (not depicted). It should be appreciated that the housing 220 may be formed as a single unitary structure, having the first housing portion 222 integrally formed with the second housing portion, if desired. The first housing portion 222 may comprise a first surface 224, shown in FIG. 4, disposed adjacent to the second housing portion 220. One or more mechanical fasteners (not depicted) may be disposed through said first surface 224 to couple the first housing portion 222 with the second housing portion thereof.

The first housing portion 222 may comprise a second surface 226 disposed generally opposite the first surface 224. A first cavity 227 may be formed in the housing 220. In the embodiment shown, at least a portion of the first cavity 227 is formed in the first housing portion 222 of the housing 220. In certain embodiments, the first cavity 227 is configured to receive at least a portion of an axle assembly 229 therein. A second cavity 228 may also be formed in the housing 220. In certain embodiments, the second cavity 228 is at least partially formed in the first housing portion 222 of the housing 220. A web portion 221 may be integrally formed between the first cavity 227 and the second cavity 228.

In one embodiment shown in FIG. 4, the second cavity 228 has a generally cylindrical shape and is defined by an annular first wall 233 and a second wall 236. As illustrated in FIG. 4, the first wall 233 includes a first portion 230, a second portion 232, and a third portion 237. The second portion 232 may have a smaller diameter than the first portion 230, and the third portion 237 may have a smaller diameter than the first and second portions 230, 232. A juncture between the first and second portions 230, 232 forms a shoulder 234, and a juncture between the second and third portions 232, 237 also forms a shoulder 235. It is understood that the shoulder 234 formed between the first and second portions 230, 232, and the shoulder 235 formed between the second and third portions 232, 237 may have any configuration as desired such as a stepped shoulder as shown in FIG. 4, for example.

A socket 238 may be formed in the second wall 236. It should be appreciated that the socket 238 may be formed in the housing 220 by any suitable method as desired. In one embodiment, the socket 238 may be machined to into the first housing portion 222. In other embodiments, the socket 238 may at least partially be formed by an annular hub extending axially outwardly from the second wall 236 of the first housing portion 222.

Additionally, an aperture 240 may be disposed concentrically through the socket 238, and through a third surface 242 of the first housing portion 222. The aperture 240 comprises a smaller diameter than a diameter of the socket 238. The third surface 242 of the first housing portion 222 may be formed a shorter axial distance from the second surface 226 than the distance between the first surface 224 and the second surface 226.

Each of the axles 100, 200, 210 may further include a high-speed, low-torque power source 244 driveably connected with the driveline connect/disconnect apparatus. In certain embodiments, the power source 244 may be a high speed-low torque power source. In other embodiments, the power source 244 may be a permanent magnet synchronous machine comprising a stator 246 disposed concentrically about a rotor 248. The stator 246 may be at least partially disposed in the second cavity 228, and non-rotatably coupled with the first housing portion 222. The rotor 248 is rotatably and concentrically disposed at least partially within the stator 246. In an embodiment, the stator 246 may be press-fit into the second cavity 228. By utilizing a press-fit between the stator 246 and the housing 220, the power source 244 may be anchored within the housing 220 to reduce flexion of components of the power source 244. Reducing flexion of the components of the power source 244 decreases NVH.

An output shaft 250 may be coupled with the rotor 248 for rotation therewith. The output shaft 250 may be rotatably supported within the first housing portion 222 via first and second bearings 252, 254. Various types of bearings may be employed for each of the first and second bearings 252, 254 such as a roller bearing, a ball bearing, and the like, for example. The first bearing 252 may be at least partially disposed within the socket 238. In certain embodiments, the first bearing 252 is press-fit into the socket 238, which results in manufacturing tolerances that may cause runout to be reduced. The second bearing 254 may be disposed in a bearing support 255. As illustrated, the bearing support 255 may be coupled with a cover 266 or the first housing portion 222. It is understood, however, that the bearing support 255 may be coupled to the cover 266 or the first housing portion 222 by any suitable means as desired. It is further understood that the bearings support 255 may be integrally formed with the cover 266 if desired.

The output shaft 250 comprises a first end 256 extending through the first bearing 252 and through the aperture 240 formed in the third surface 242 of the first housing portion 222. A gear 258 may be coupled with the first end 256 of the output shaft 250. It should be appreciated that the gear 258 may be a separate component disposed on the output shaft 250 as shown in FIG. 4 or integrally formed with the output shaft 250 as desired. In certain embodiments, the gear 258 may be drivingly engaged with an idler gear (not depicted), which may further be drivingly engaged with one of a cam assembly (not depicted) and a ball ramp assembly (not shown) of the connect/disconnect apparatus employed in at least one of the axles 100, 200, 210. In certain embodiments, the connect/disconnect apparatus may be employed in at least one of the front axle disconnect 110, the power transfer unit 206, and the rear drive unit 212. A sensor 264 may also be disposed about the output shaft 250. In one example, the sensor 264 may be disposed about a second end 265 of the output shaft 250 adjacent the second bearing 254. The sensor 264 may be configured to measure an angular velocity or position of the output shaft 250.

Additionally, the cover 266 may be coupled to the housing 220. As illustrated, the cover 266 is disposed adjacent and coupled to the second surface 226 of the first housing portion 222. The cover 266 may comprise a generally cylindrical geometry having a first radially outer wall 268. It is understood, however, that the cover 266 may have any shape and size, as well as be produced from any material (e.g. a metal or a non-metal material), as desired. A generally discoid axial end wall 270 is formed with the first radially outer wall 268. A radially extending annular flange 272 may be formed with the first radially outer wall 268 opposite the axial end wall 270. An annular groove 276 may be formed in the annular flange 272. A sealing member 278 may be coupled with the annular flange 272, and at least partially disposed within the groove 276 when the cover 266 is coupled with the first housing portion 222. The sealing member 278 forms a substantially fluid-tight seal between the cover 266 and the first housing portion 222. In certain embodiments, the cover 266 may be coupled with the first housing portion 222 via mechanical fasteners such as bolts (not depicted). It is understood, however, that the cover 266 may be coupled to the housing 220 by any suitable method as desired such as by a weld, epoxy, interference fit, and the like, for example.

Each component of the axles 100, 200, 210 includes some manufacturing tolerance associated with each dimension. The manufacturing tolerances of the the axles 100, 200, 210 are summed to provide the inaccuracy in each dimension of the axles 100, 200, 210. Integrating the power source 244 directly into the housing 220 of at least one of the axles 100, 200, 210 reduces the tolerance stacks thereof. Reducing the tolerance stacks provides greater control of the gear 258 tooth center distance and runout. The reduced tolerance stacks further provide more even torque transmission and reduced NVH. The present disclosure also eliminates a separate power source housing and an associated sealing member for the power source 244. Eliminating the separate power source housing enables improved sealing capability by removing a lubricant leak path. Further, integrating the power source 244 directly into the housing 220 of at least one of the axles 100, 200, 210 conserves the package space thereof while maintaining a robust design.

Figure 5:
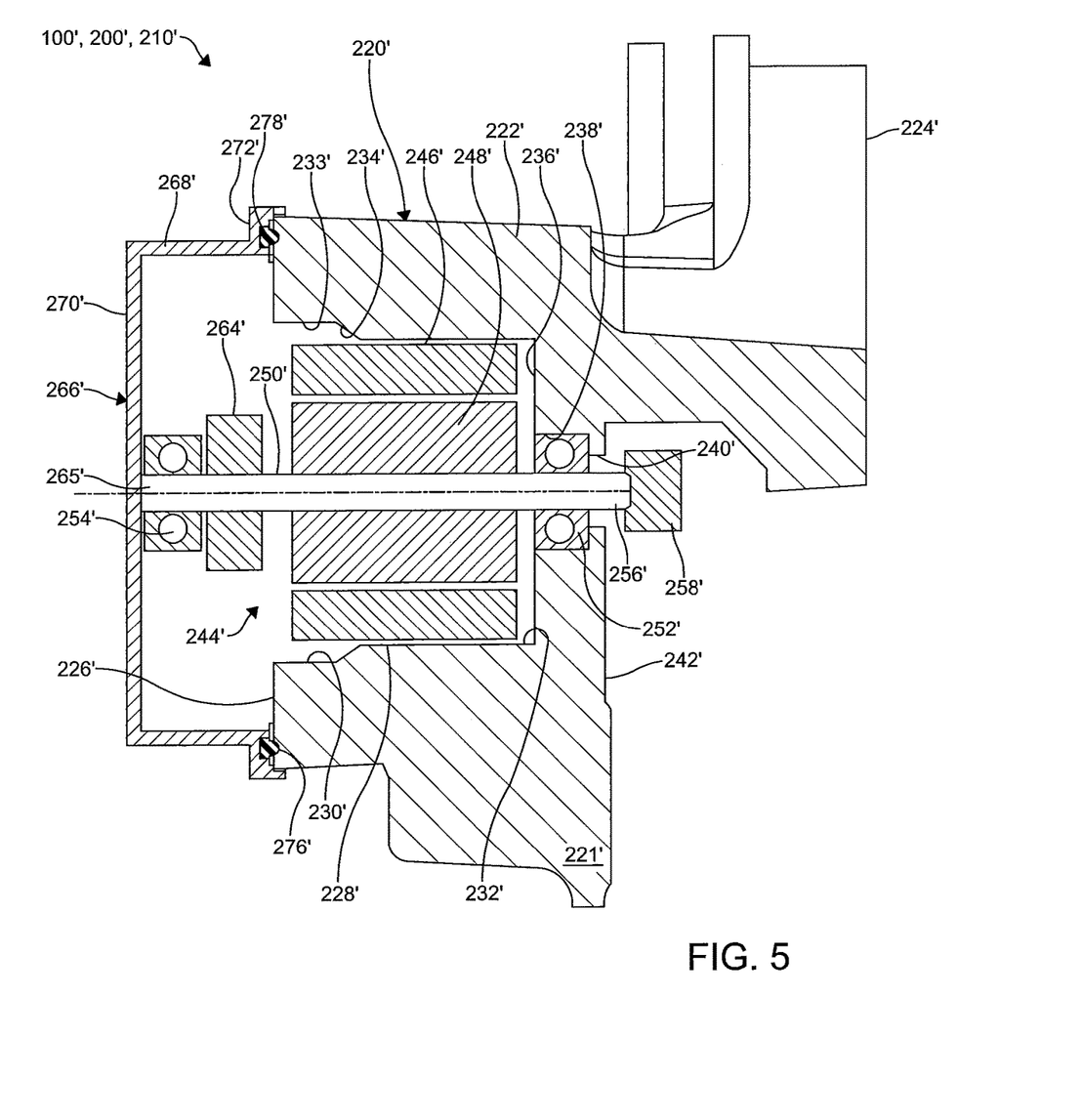
FIG. 5 is a fragmentary cross-sectional view of a portion of the axle including an integrated power source housing according to another embodiment of presently disclosed subject matter, wherein a power source assembly disposed in the power source housing is illustrated generally as a graphical representations.

FIG. 5 shows an alternative embodiment of the housing 220 illustrated in FIGS. 3-4. Structure similar to that illustrated in FIGS. 3-4 includes the same reference numeral and a prime (') symbol for clarity. In FIG. 5, the housing 220' is substantially similar to the housing 220, except the housing 220' includes only a first portion 230' and a second portion 232' formed in the first wall 233' of the first housing portion 222'. The second portion 232' may have a smaller diameter than the first portion 230'. A juncture between the first and second portions 230', 232' forms a shoulder 234'. It is understood that the shoulder 234' formed between the first and second portions 230', 232' may have any configuration as desired such as a conical shaped shoulder as shown in FIG. 5, for example. For example, the diameter of the first portion 230' may gradually decrease to the diameter of the second portion 232'.

While various embodiments of the presently disclosed subject matter have been described above, it should be understood that they have been presented by way of example, and not limitation. It will be apparent to persons skilled in the relevant art(s) that the disclosed subject matter may be embodied in other specific forms without departing from the spirit or essential characteristics thereof. The embodiments described above are therefore to be considered in all respects as illustrative, not restrictive.

What is claimed is:

1. An axle, comprising:
    a housing having a cavity formed therein, wherein the cavity is defined by a first wall and a second wall, the first wall including at least a first portion and a second portion;
    wherein a first shoulder is formed between the first portion and the second portion of the first wall;
    wherein the first shoulder forms a recess that circumferentially extends around at least a portion of a power source; and
    an aperture formed through the second wall;
    wherein the power source assembly is at least partially disposed in the cavity of the housing, and includes an output shaft that extends through the aperture formed in the second wall of the housing; and
    wherein the power source assembly includes a stator that is press-fit into the cavity.

2. The axle according to claim 1, wherein the cavity has a generally cylindrical shape.

3. The axle according to claim 1, wherein the first wall further includes a third portion, wherein a second shoulder is formed between the second portion and the third portion of the first wall.

4. The axle according to claim 3, wherein the first shoulder has a stepped shape and a generally conical shape.

5. The axle according to claim 3, wherein a diameter of the second portion of the first wall is less than a diameter of the first portion of the first wall and greater than a diameter of the third portion of the first wall.

6. The axle according to claim 1, wherein the power source assembly further includes at least one bearing to rotatably support the output shaft within the housing, wherein the at least one bearing is at least partially disposed in the second wall of the housing.

7. The axle according to claim 6, wherein the second wall further includes a socket formed therein, the socket configured to receive the at least one bearing therein.

8. The axle according to claim 1, further comprising a cover coupled to the housing and configured to perform as a closure to the cavity.

9. The axle according to claim 8, further comprising a sealing member disposed between the housing and the cover to form a substantially fluid-tight seal therebetween.

10. The axle according to claim 1, further comprising a sensor coupled to a rotor shaft of the power source assembly and positioned in the second cavity.

11. The axle according to claim 10, wherein the sensor is disposed axially between a bearing coupled to the rotor shaft and a rotor of the power source assembly.

12. The axle according to claim 10, wherein the sensor is an angular velocity sensor.

13. The axle of claim 10, wherein the sensor is a position sensor.

14. An axle, comprising:
    a housing having a first cavity and a second cavity formed therein;
    wherein the first cavity is configured to receive at least a portion of an axle assembly therein, and the second cavity is configured to receive at least a portion of a power source assembly therein;
    wherein a shoulder in the second cavity forms a recess that circumferentially extends around at least a portion of a power source in the power source assembly;
    wherein the power source assembly includes an output shaft that extends through an aperture formed in a wall of the housing that divides the first cavity from the second cavity;
    wherein an end of the output shaft is coupled to a gear in the first cavity and is unsupported; and
    wherein the power source assembly includes a stator that is press-fit into the second cavity.

15. The axle according to claim 14, wherein an axis of rotation of the axle assembly is parallel to an axis of rotation of the power source assembly.

16. The axle according to claim 14, wherein the housing further includes a web integrally formed between the first cavity and the second cavity.

17. The axle according to claim 14, wherein the second cavity is defined by a first wall and a second wall, the second wall having an aperture formed therethrough.

18. The axle according to claim 17, wherein the power source assembly includes an output shaft extending from the second cavity through the aperture formed in the second wall of the housing and into the first cavity.

19. The axle according to claim 14, further comprising a cover coupled to the housing and configured to perform as a closure to the second cavity, and a sealing member disposed between the housing and the cover to form a substantially fluid-tight seal therebetween.

* * * * *